July 10, 1962

T. R. BERGH ET AL 3,043,567

RADIANT ACOUSTICAL SYSTEM

Filed Feb. 17, 1958

INVENTORS
Thomas R. Bergh, Dale E. King,
Raymond C. Nierzwicki & Parker Thorne.
BY
Davis, Lindsey, Hibben & Noyes
Attys.

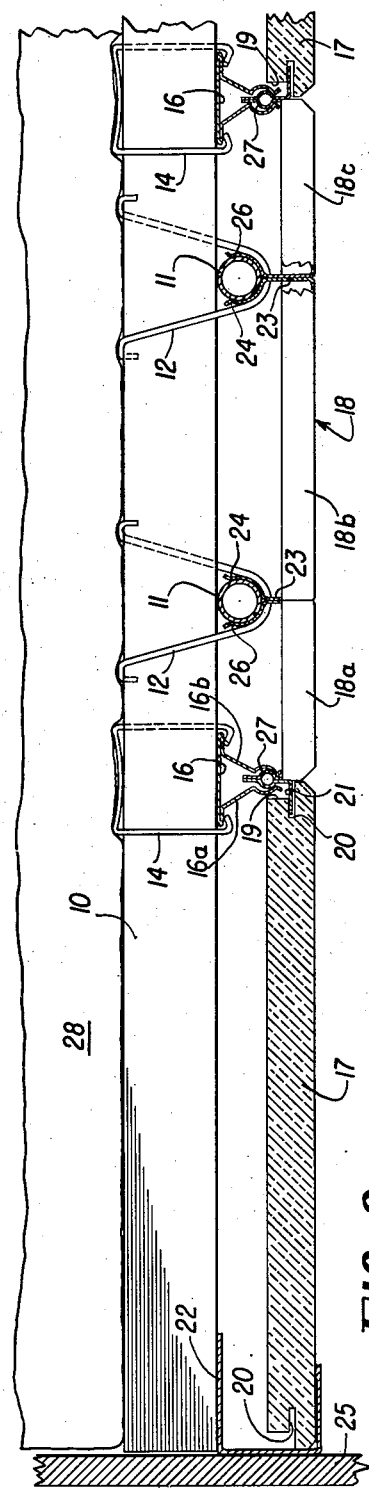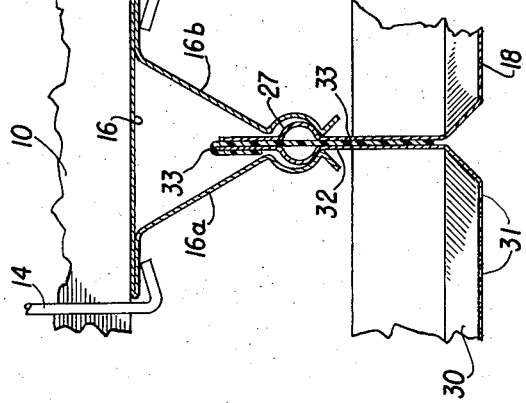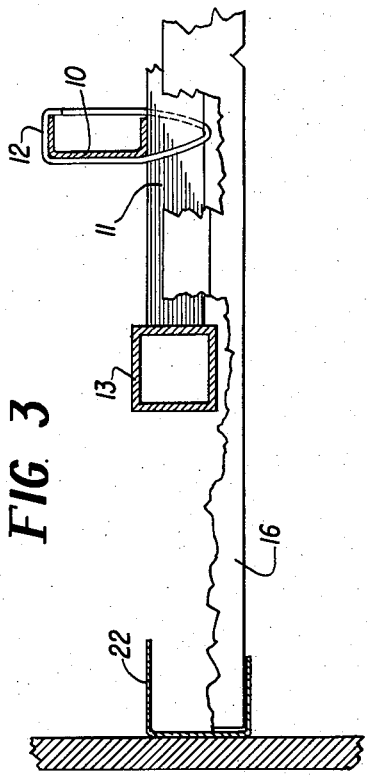

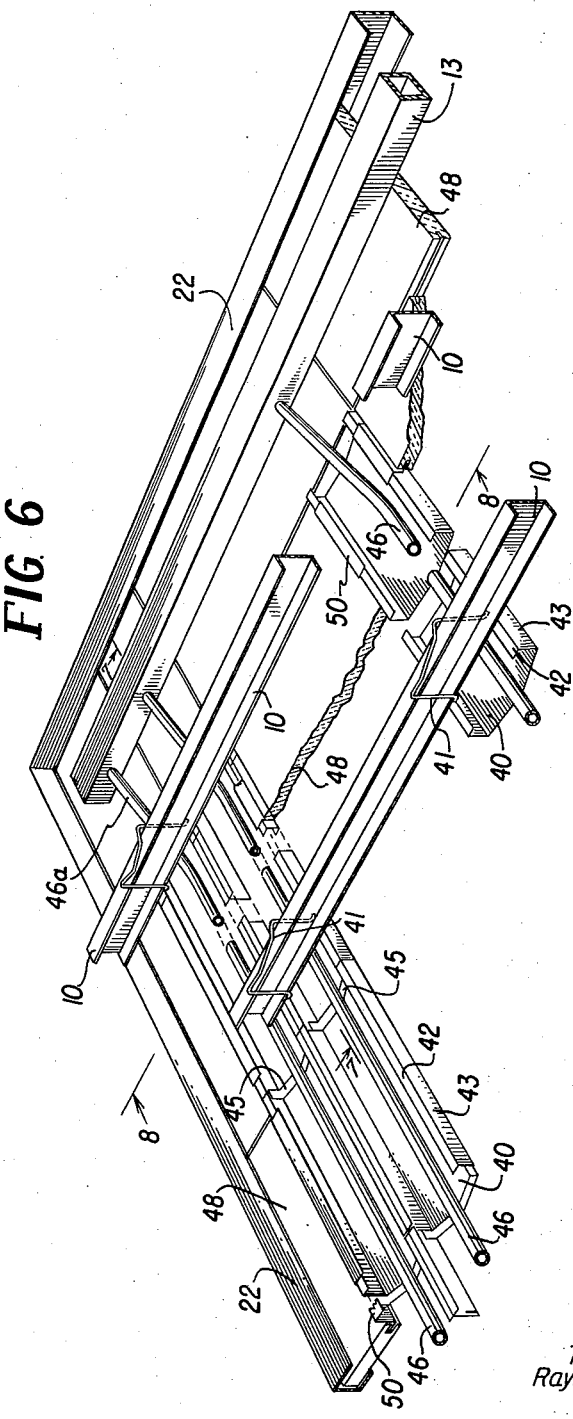

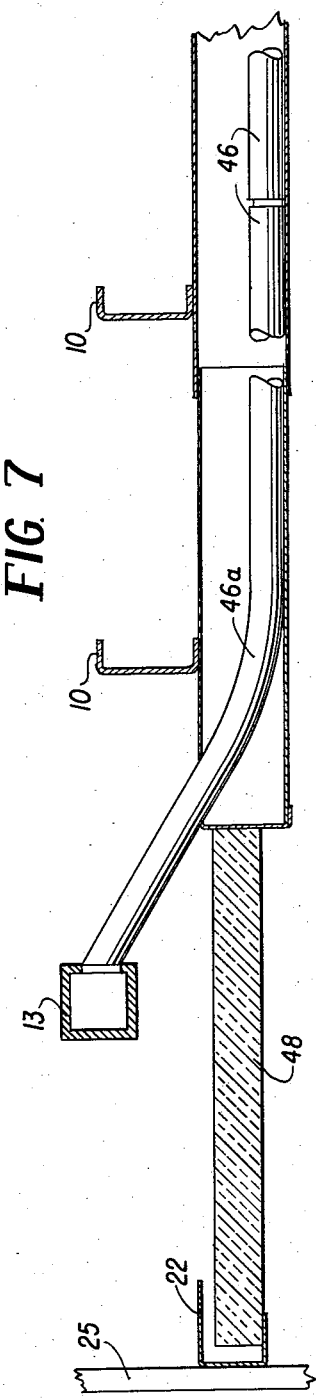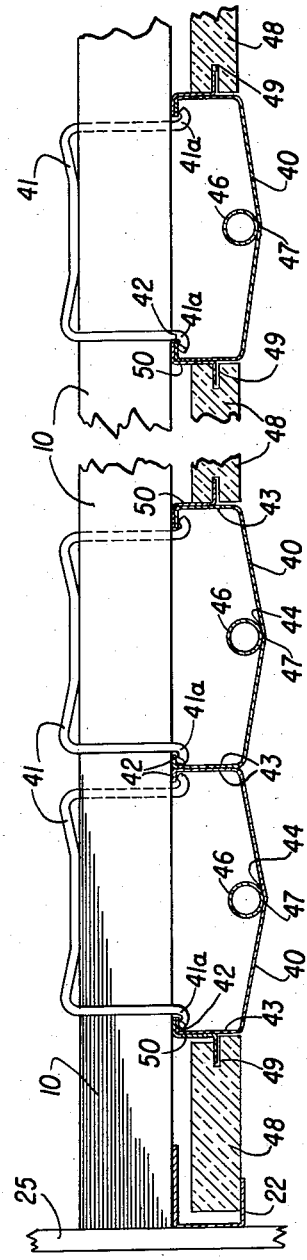

July 10, 1962 T. R. BERGH ET AL 3,043,567
RADIANT ACOUSTICAL SYSTEM
Filed Feb. 17, 1958 5 Sheets-Sheet 5

INVENTORS
Thomas R. Bergh, Dale E. King,
Raymond C. Nierzwicki & Parker Thorne.
BY
Davis, Lindsey, Hibben & Noyes
Attys.

United States Patent Office 3,043,567
Patented July 10, 1962

3,043,567
RADIANT ACOUSTICAL SYSTEM
Thomas R. Bergh, Elmhurst, Dale E. King, Downers Grove, Raymond C. Nierzwicki, Chicago, and Parker Thorne, Skokie, Ill., assignors to Airtex Corporation, Chicago, Ill., a corporation of Illinois
Filed Feb. 17, 1958, Ser. No. 715,734
10 Claims. (Cl. 257—124)

This invention relates to a radiant heating or cooling structure having acoustical properties for use in controlling the temperature and sound of rooms of buildings and other compartments.

The radiant acoustical heating or cooling systems that have been devised and commercially installed heretofore have comprised relatively wide perforated radiant metal pans or panels disposed over the entire ceiling area and which have been provided with upturned metal flanges at their side edges in engagement with heating or cooling pipes. Such systems, however, have possessed several disadvantages and defects which detracted from their radiant and acoustical functions and retarded to a degree their commercial acceptability. It was found that considerable areas of the panels which were remote from the pipes were low in radiating efficiency and consequently uniform heating radiation was not achieved. The perforations in the panels also permitted sounds to pass from one room to an adjacent room through the adjoining plenum chambers above the panels, and the use of perforated pans over a greater portion of the ceiling area increased the costs of the installation and did not permit the use of lower cost non-metallic tile panels for sound absorption. Moreover, the systems were relatively inflexible and could not be varied functionally or designwise to suit specific conditions which carried between installations.

It is, therefore, one of the principal objects of the present invention to eliminate the deflects and disadvantages of the previous constructions and to provide an improved radiant acoustical heating or cooling system which is of relatively simple and inexpensive construction and may be readily installed with a minimum of labor.

Another object of the invention is to provide a radiant acoustical heating or cooling structure wherein the radiant panels are high in radiating efficiency over their entire area and possess no areas of minimum radiation, thus affording uniform radiation and uniform heating or cooling.

Still another object is to provide a radiant heating system of the foregoing character wherein radiant panels of high thermal efficiency are provided so as to permit their use in conjunction with standard acoustical mineral or fiber tile panels which are of inexpensive construction.

A further object is to provide a radiant heating and cooling system wherein the radiant and acoustical panels are of solid imperforate construction thereby reducing measurably the transmission of sound from one room to another in a building.

A still further object is to provide a radiant acoustical system which is capable of being varied in functional arrangement and in design to accommodate varying conditions and preferences from one installation to another.

Another further object is to provide radiant panels in a radiant heating and cooling system whereby the thermal loss between the pipes and the radiating surfaces of the panels is reduced to a minimum thus providing a system of greater efficiency and of more uniform operation.

Other objects and advantages of the present invention will become apparent as this description progresses, reference being had to the accompanying drawings, in which:

FIG. 2 is a side elevation, fragmentary view, partially in section, of a portion of the radiant acoustical structure shown in FIG. 1;

FIG. 3 is an irregular, vertical sectional view taken on the line 3—3 of FIG. 1, looking in the direction of the arrows;

FIG. 4 is a side elevational, fragmentary view, partially in section of another embodiment of the present invention in which the acoustical panel members are perforated metal pans;

FIG. 5 is an enlarged vertical sectional view illustrating in detail the relationship of the flanges of the metal pans to each other and to the supporting T bar in the embodiment of FIG. 4;

FIG. 6 is a top perspective, fragmentary view of another radiant acoustical structure comprising a further modified form of the present invention;

FIG. 7 is a vertical sectional view taken on the line 7—7 of FIG. 6 looking in the direction of the arrows;

FIG. 8 is a vertical sectional view taken on the line 8—8 in FIG. 6, looking in the direction of the arrows and with a portion of the structure broken away;

Figure 1:
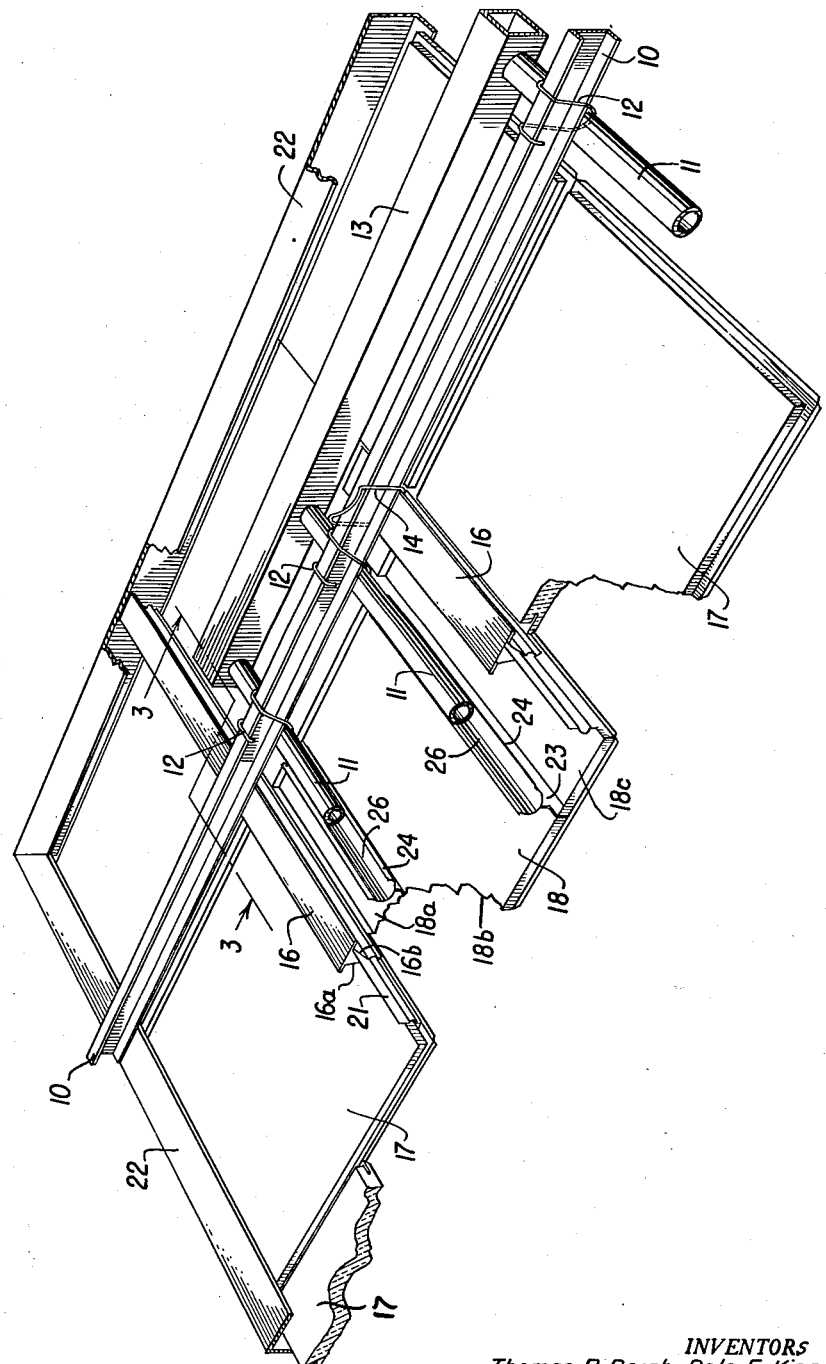
FIGURE 1 is a top perspective fragmentary view of a radiant acoustical structure comprising one embodiment of the present invention and adapted for heating or cooling a space in which it may be mounted.

Referring more particularly to FIGS. 1 to 3 of the drawings, there is shown one embodiment of the present invention which is adapted for use as a radiant acoustical ceiling structure for the heating or cooling of a room and for sound absorption. The structure is supported from a plurality of parallel spaced suspension channels 10 which may be secured to the building ceiling in the usual manner and in spaced relation therefrom. A plurality of circular pipes 11 which serve as temperature controlling members are suspended from the channels 10 closely adjacent the under sides thereof by means of coil clips 12. The pipes 11 which may contain heated fluid if the system is used for radiant heating purposes or a coolant if the system is used for radiant cooling, extend at right angles to the channels and connect to a common transverse square pipe or header 13 which is in communication with a source of a heating or a cooling fluid.

Also suspended from the spaced channel members 10 by means of clips 14 are a plurality of elongated T bars 16 which also extend at right angles to the channels and in parallel relation with the pipes 11. The pipes 11 are arranged in spaced pairs throughout the ceiling structure and each of the pairs is disposed between adjacent T bars 16. The T bars 16 serve to support a plurality of ceiling panels 17 and 18 which may be arranged in alternate rows across the entire extend of the ceiling area but which may be varied in arrangement as desired.

The panels 17 may be of solid mineral tile or of other inexpensive non-metallic materials which possess high sound absorbing qualities while the panels 18 which are also of solid, imperforate construction serve as the heat radiant panels. As shown in FIGS. 1 and 2, the mineral tile panels 17 are cut back along their upper margins as at 19 to provide clearance for the T bars 16 and they are also provided with horizontal slots 20 into which are received the horizontal portions of elongated L-shaped supporting members or hooks 21. The vertical leg portions of the supporting members 21 are received up between the resilient legs 16a and 16b of the T bars where they are resiliently held so as to support the panels 17 in even horizontal alignment. The rows of panels 17 which are disposed within the inner portions of the ceiling area are supported on their two parallel sides by the supporting members 21 held in the T bars 16 while the panels 17 which, as shown in FIGS. 1 and 2, may be disposed around the marginal portions of the ceiling are supported only at their inner edges by the supporting members 21 and at their outer edges by the horizontal lower flange of a U-shaped molding 22 secured around the four walls 25 of the room at a predetermined distance below the main building ceiling.

The radiant metal panels 18 may be formed by three elongated sections 18a, 18b and 18c formed from solid aluminum sheets having high heat conducting characteristics and arranged side by side in abutting relation. These three sections are joined together by welding or other means as at 23 where the two outer sections abut the central section 18b so as to form, in effect, a single metal panel unit having the proper shape and construction for accomplishing the objects of the present invention. The central section 18b is provided with an upstanding flange 24 at each of its side edges which is curved at its upper portion to closely conform to the curvature of the pipes 11. The outer panel sections 18a and 18c are also provided with upstanding flanges 26 and 27 along their side edges, the upstanding flanges 26 adjacent the central panel section 18b being of similar shape and construction as the flanges 24 and together with the flanges 24 form a pair of parallel saddles or channels by which the pipes 11 are intimately engaged. Welds 23 secure the adjacent flanges 24 and 26 together so that the three sections 18a, 18b and 18c are combined as a rigid unit to form the single metal panel 18. However, it is to be understood that the radiant panel 18 can be formed as a one-piece construction such as by the extrusion, roll forming or other methods. The panel flanges also serve to stiffen the panels to prevent buckling and distortion during use.

The upstanding flanges 27 at the outer side edges of the panel sections 18a and 18c extend upwardly between the spring legs 16a and 16b of the respective T bars 16 in abutting relation with the vertical legs of the supporting members 21 for the mineral tile panels 17, and thus the radiant panels 18 are also securely held in even horizontal position by the T bars 16. The flanges 24, 26 and 27 of the radiant panel 18 are of such length and proportion that when the flanges 27 are pushed up into secured position within the T bars 16, the pipe engaging saddles formed by the flanges 24 and 26 will tightly engage at least the lower halves of the peripheries of the respective pipes 11 so as to provide for high thermal conductivity between the pipes 11 and the radiant panels 18. The flanges 24 and 26 with their pipe engaging portions constitute heat bridges of increased cross section with the result that there is greater and more efficient thermal conductivity between the pipes 11 and the radiating panels 18 than heretofore achieved.

The width of the central radiant panel section 18b is substantially twice that of the panel sections 18a and 18c so that with respect to the overall width of the panel 18, the pipes 11 and pipe saddles are spaced twice as far from each other than they are from the side edges or flanges 27 and T bars 16. For example, the overall width of the panel 18 may be twelve inches and the pipes 11 with respect thereto are therefore spaced approximately three inches inwardly from the side edge flanges 27 of the panels 18a and 18b and approximately six inches from each other. Such construction provides a radiant panel with a high output per square inch of radiating surface for greater uniformity of heat control and permits a greater concentration of heating or cooling surface at the outside walls of a room.

It has been found that in the use of the radiant panels 18 of the present invention under normal operating temperatures in the heating or cooling of a room, the areas of greatest radiation efficiency extend to limited points on either side of the pipes 11 and, consequently, in the radiant ceiling constructions which have been employed heretofore wherein the radiant metal panels were secured at their side edges to the pipes which were thus spaced farther apart, there were considerable inner areas of the panels which had considerably lower radiation characteristics. This resulted in a waste of expensive surface area and did not permit concentration of radiation in room areas such as adjacent outside walls where such concentration was required for the most efficient heating or cooling of a room. However, with the panels 18 of the present invention having an overall width of twelve inches in the example above described, the areas of greatest concentration of radiation extend to approximately three inches on either side of the pipes 11, the three inch areas on the panel 18 between the pipes being contiguous. Hence, all the side areas and all of the interior areas of the panels 18 lie within the three inch or high thermal conductivity range of the pipes 11 and there exists no area throughout the entire panel which may be considered of low radiating efficiency. These results are achieved, in general, by arranging the pipes and the panel dimensions so that the saddles or heat bridge portions 24—26 are spaced from each other a distance not greater than twice the distance of said portions from the side edges of the panel.

As shown more particularly in FIG. 2, a thermal insulation blanket 28 overlies the suspension channels 10 and extends throughout the entire ceiling area. This blanket 28 serves to prevent the loss of heat upwardly through the building ceiling and to confine it to the plenum chamber above the sound absorbing panels 17 and the radiant panels 18 which are also warmed thereby. It is to be understood that the acoustical panels 17 also serve as radiant panels by reason of the fact that they become heated or cooled by radiation from the heated metal pipes and saddles and panels 18 and by air conduction and by convection of heated or cooled air which circulates within the plenum chamber. Thus, the entire ceiling arrangement serves as a radiating surface area but permits the utilization of the panels 18 having a great concentration of radiating surface which can be arranged and disposed most advantageously at areas where needed. Another result of such concentration of radiating area is that standard acoustical tiles or panels 17 may be employed and since such acoustical tiles are considerably less expensive than the radiating panels which have been required over the entire ceiling heretofore the cost of the acoustical radiant ceiling arrangement comprising the present invention is considerably reduced without loss of efficiency.

As has already been noted, the radiant panels 18 and the acoustical panels 17 are solid and imperforate and hence they possess advantages not found heretofore where radiant acoustical panels were perforated. Where perforated radiant acoustical panels are used, there was not only a loss in radiant effect but the perforations permitted warm air to enter the room space below the panels by convection resulting in a convection action in the conditioned space and in undesirable interference with the radiant heating of the space. The solidity of panels 17 and 18 also reduces the transmission of sound from one room to another. Where perforated panels are used, sounds pass upwardly through the perforations into the plenum chamber where some but not all of such sounds were absorbed by acoustical insulation blankets and the like. The sounds not so absorbed passed laterally and entered adjacent rooms through the plenum chambers thereabove and down through the perforations into the panels of the adjacent rooms to the occupants thereof.

The use of the radiant panels 18 having a high concentrated radiating efficiency also provides for a more exacting design for optimum noise reduction through variable uses of the sound deadening panels 17 and affords greater freedom of aesthetic design by the use of various standard types of acoustical materials on various centers. Hence, ceiling arrangements can be varied not only to afford greater flexibility in the solution of specific problems arising from the specific heating or cooling requirements of the room space but also to create various ceiling designs as may be more acceptable or desirable aesthetically to the users and occupants of the rooms.

The use of headers 13 which are square in cross section in conjunction with the round pipes 11 eliminates the necessity of cutting the side flanges of the thermal and acoustical panels which results in the panels being weakened and hence subject to buckling and distortion as the result of repeated temperature changes. Such cutting of the stiffening flanges of the panels has been heretofore required to accommodate the space consuming round headers which must necessarily be of larger size than the pipes 11 to conduct the necessary quantities of heating or cooling fluids to the pipes 11.

In FIGS. 4 and 5, there is illustrated a modified form of radiant acoustical ceiling structure which is generally similar to that structure previously described as to FIGS. 1 to 3, inclusive, except that a perforated acoustical metal panel 30 has been substituted for the mineral tile panel 17 of the first embodiment. Like the acoustical tile 17 of the first embodiment, this panel 30 may be of substantially standard construction. In this second embodiment, which possesses substantially all the benefits and advantages of the first embodiment, the thermal insulation blanket 28 also assumes a sound absorbing function for sounds passing upwardly through the perforations 31 of the panel 30. This perforated acoustical panel 30 may also be of any suitable metal preferably of aluminum like the radiant panel 18 and is provided with upstanding side flanges 32 which are adapted to be inserted up within the T bars 16 so that the panel 30 will be resiliently held in even horizontal position thereby.

A spacer strip 33 of plastic or other suitable material is positioned between the flanges 32 and 27 of the acoustical pan 30 and the radiant pan 18, respectively, and serves to space the flanges of the respective pans from each other and break the metal to metal contact therebetween. The spacer strip 33 is folded over and secured to the flange 32 of the acoustical pan 30 so as to be carried thereby for ready installation up within the T bar 16. As in the first embodiment, the acoustical panels 30 adjacent the walls 25 of the room may be supported at their outer sides by the molding 22.

A further embodiment of the present invention shown in FIGS. 6, 7 and 8 of the drawings also possesses substantially all of the benefits and advantages of the embodiments of FIGS. 1 to 5, inclusive, but is arranged in a somewhat different manner structurally. The suspension channels 10 are arranged in a similar manner in spaced parallel relationship and the U-shaped moldings 22 are arranged around the side walls of the room. A plurality of solid elongated panels 40 formed of heat conducting metal such as aluminum are supported from the suspension channels 10 by spring clips 41, the lower ends 41a of which hook under and engage the inturned flanges 42 on the upper ends of the respective upstanding flanges 43 of the panels 40.

As shown in the drawings, these panel sections 40 may be arranged adjacent to each other in pairs and form a unitary panel like panel 18 of the first embodiment, or may be utilized separately, as shown, where greater heat concentration is not required, thus affording greater flexibility and variation to accommodate varying temperature and sound conditions. When used in pairs to form a unit, as will become apparent hereinafter, the structure, operation and radiating efficiency of the panels 40 approximates that of the radiating panel 18 of the first embodiment. Closure strips 45 are positioned in overlapping relation within the abutting ends of the adjacent panels 40 so as to close the slight gaps which may exist therebetween.

The bottom walls of the panel 40 are tapered slightly downwardly from their side walls 43 in a wide V shape to form shallow channels or cradles 44 in which are laid and supported the pipes 46 which are similar in construction and purpose as pipes 11 of the first embodiment. In order to afford high thermal conductivity between the pipes 46 and the radiant panels 40, and to maintain their assembled relationship, the pipes 46 are seam-welded to the panels 40 as at 47. The pipes 46 are also bent upwardly from the radiant panels 40 as at 46a adjacent one wall 25 of the room and connect with the square header 13 which leads to a source of a heating or cooling fluid. It is thus seen that the panels 40 form supporting cradles or saddles for the pipes 46 whereas in the first embodiment the pipes 11 were supported directly from the suspension channels 10.

Acoustical mineral tile panels 48 which may be somewhat similar to the panels 17 of the first embodiment are arranged endwise between the pairs of radiant panels 40 or between single radiant panels 40 to afford sound absorbing facilities in the ceiling structure. These acoustical panels 48 may be varied in width as desired to adapt the ceiling structure to varying conditions and requirements of sound absorption and radiant heating or cooling. The panels 48 are provided with slots 49 cut into their side walls into which project the lower horizontal portions of S hooks 50 which abut the vertical radiant panel flanges 43 and overlie the inturned panel flanges 42. The spring clips 41 therefore support not only the radiant panels 40 from the suspension channels 10 but the acoustical panels 48 as well thereby providing an inexpensive construction which can be readily assembled in a minimum time. As in the other embodiments, the acoustical panels 48 at the marginal edges of the room may be supported at their outer edges by the molding 22.

The panel sections 40 are narrow and of identical shape and construction so that when they are employed in pairs to form in effect a single panel unit like panel 18 of the first embodiment, their radiating efficiency is similar to the panels 18 of the first embodiment and may even be higher due to the direct engagement between the panels 40 and the pipes 46. The individual panels 40 are of such restricted width that the areas of the bottom walls thereof have high radiant characteristics and efficiency and there are no areas of reduced or minimum radiation. When used in pairs these panels 40 thus will provide a total effective radiating surface of high concentration and thus will possess substantially all the benefits and advantages of the first embodiment. As in the first embodiment, a thermal insulating blanket (not shown) may be laid over the suspension channels 10 to prevent heat loss from the plenum chamber. It is also to be understood that perforated panels similar to the panels 30 of the second embodiment may be substituted for the panels 48 and utilized with satisfactory results with the panels 40.

Figure 9:
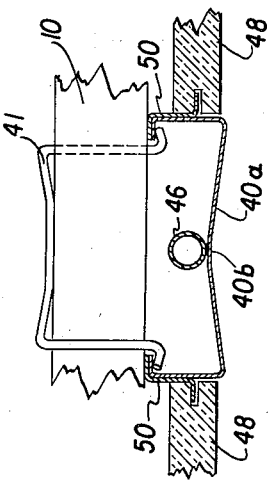
FIG. 9 is a view, partially in section, of another modification of a radiating panel comprising one of the features of the present invention.

The radiant panels 40 of the radiant acoustical system shown in FIGS. 6, 7 and 8 may also take the form of the panel 40a as shown in FIG. 9 wherein the bottom wall of the panel slopes upwardly from each of the side flanges 43 to a narrow central portion 40b to which the pipe 46 may be seam welded. The other elements of the arrangement of FIG. 9 which are similar to FIGS. 6 to 8, inclusive, have been designated with the same reference numerals and need not again be described. The radiating efficiency of the panels 40a of this modification is substantially the same as those of FIGS. 6 to 8, inclusive, but because of the upward inclination of the bottom wall, any tendency of the panel to reflect light and to cause glare is substantially reduced.

Figure 10:
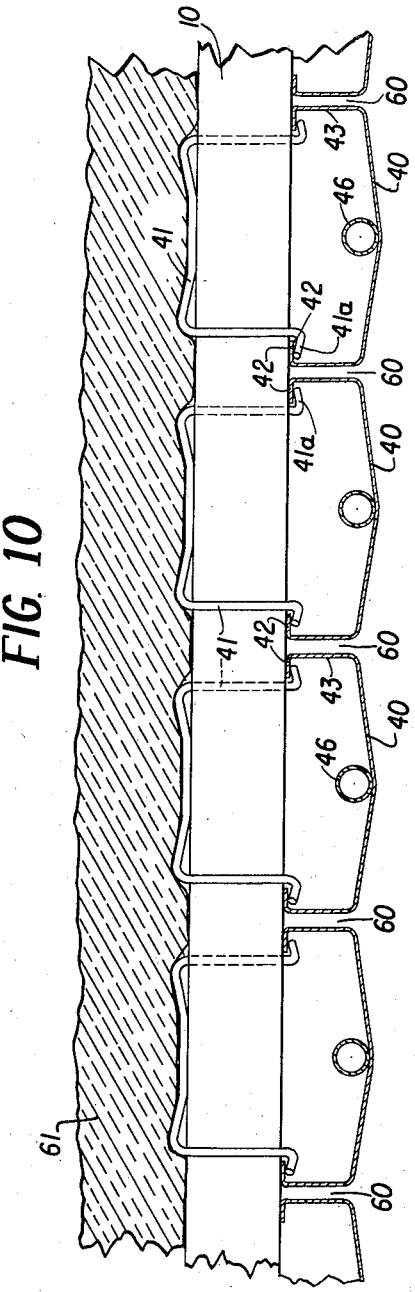
FIG. 10 is a view, partially in section, of another further modified form of radiant acoustical system.

The further modified form of radiant acoustical system shown in FIG. 10 of the drawings is somewhat on the order of that shown in FIGS. 6 to 8, inclusive, except that acoustical tile members 48 have been eliminated entirely and the sound absorbing function taken care of in another manner. Similar to FIGS. 6 to 8, inclusive, the pipes 46 are secured to the central portions of the panels 40 and the panels are supported from the supporting channels 10 by the clips 41, the lower hooked ends 41a of which engage under the inturned pan flanges 42. The pans 40 and the pipes 46 are so spaced that a relatively narrow space 60 exists between the upstanding side flanges 43 of each of the adjacent pans 40. A sound absorbing insulation bat or pad 61 is disposed above the supporting channels 10 and serves to absorb a major portion of any sounds that pass upwardly from the room below through the spaces 60 between the panels 40 and into the plenum chamber thereabove. Thus, the radiant system may still provide solid radiating pans of high efficiency without the necessity of using any kind of acoustical pans whatsoever, the acoustical function of the system being achieved merely by the spacing of the pans 40 from each other and providing a sound absorbing element thereabove.

Although there have been described above and illustrated in the accompanying drawings a plurality of embodiments of the present invention, it is to be understood that changes and modification may be made in the details of structure and operation without departing from the spirit and scope of the appended claims.

We claim:
1. A readily attachable and detachable radiant panel unit for use in a building structure having a temperature regulating apparatus including a plurality of fluid pipes arranged in parallel spaced pairs with each pair of pipes disposed between a pair of elongated panel supports having resiliently spreadable gripping portions, said panel unit comprising an elongated thermally conductive metal panel having oppositely disposed side edges, parallel flanges projecting transversely from the plane of said panel at said edges and having interlock portions, said flanges being insertable between the gripping portions of a pair of panel supports by pressing said panel toward the panel supports in a direction transverse to the plane of said panel thereby detachably interfitting said interlock portions with the gripping portions of the panel supports for supporting said panel on the building structure, and a pair of elongated thermally conductive heat bridge members integral with said panel and projecting transversely from the plane of said panel along a major portion of its length in inwardly spaced relation from and parallel to said edges, said heat bridge members having curved generally U-shaped outermost portions complementary to the configuration of the pipes and detachably engageable with a pair of pipes in close-fitting thermally conductive relation therewith when said flanges are engaged with the panel supports, said heat bridge members being spaced from each other a distance not substantially greater than twice the distance between said heat bridge members and the respective adjacent side edges of said panel whereby to provide high radiating efficiency over substantially the entire area of said panel, and said panel unit being readily attachable to and detachable from the building structure without disturbing adjacent panel units merely by pressing the panel unit toward and pulling the panel unit away from the building structure to engage and disengage said flanges and said heat bridge members with respect to the panel supports and the pipes, respectively.

2. The panel unit of claim 1 further characterized in that said heat bridge members are spaced from each other substantially twice the distance between said heat bridge members and the respective adjacent side edges of said panel.

3. The panel units of claim 2 further characterized in that said heat bridge members are spaced approximately six inches from each other and approximately three inches inwardly from the respective adjacent side edges of said panel.

4. The panel unit of claim 1 further characterized in that said U-shaped portions of said heat bridge members are dimensioned so as to engage at least half of the peripheries of the respective pipes.

5. The panel unit of claim 1 further characterized in that said panel comprises an elongated central panel section and a pair of elongated outer panel sections arranged in side-by-side relation, each of said panel sections including a thermally conductive metal panel member having parallel flange portions projecting transversely from the plane of the panel member and extending along its oppositely disposed side edges with the innermost flange portions of said outer panel sections being rigidly connected to the adjacent flange portions of said central panel section to provide said heat bridge members, the outer ends of said rigidly connected flange portions having oppositely curved configurations whereby to provide a pair of elongated heat conducting saddles comprising said U-shaped portions, and the outermost flange portions of said outer panel sections comprising said flanges engageable with the panel supports for supporting the panel unit on the building structure.

6. In a temperature regulating apparatus for use in a building structure, the combination of a pair of parallel spaced panel supports having resiliently spreadable gripping portions, a pair of parallel spaced fluid pipes disposed between said pair of panel supports, and a radiant panel unit, said panel unit comprising an elongated thermally conductive metal panel having oppositely disposed side edges, parallel flanges projecting transversely from the plane of said panel at said edges and having interlock portions, said flanges being removably disposed between and detachably engaged by said gripping portions with said interlock portions interfitted with said gripping portions, said flanges being insertable between said gripping portions by pressing said panel toward said panel supports in a direction transverse to the plane of said panel, and a pair of elongated thermally conductive heat bridge members integral with said panel and projecting transversely from the plane of said panel along a major portion of its length in inwardly spaced relation from and parallel to said edges, said heat bridge members having curved generally U-shaped outermost portions complementary to the configuration of said pipes and detachably engaging said pipes in close-fitting thermally conductive relation therewith, the distance between said pipes and the corresponding distance between said heat bridge members being not substantially greater than twice the distance between said heat bridge members and the respective adjacent side edges of said panel whereby to provide high radiating efficiency over substantially the entire area of said panel, and said panel unit being readily attachable to and detachable from the building structure without disturbing adjacent panel units merely by pressing the panel unit toward and pulling the panel unit away from the building structure to engage and disengage said flanges and said heat bridge members with respect to the panel supports and the pipes, respectively.

7. The combination of claim 6 further characterized in that said heat bridge members are spaced from each other substantially twice the distance between said heat bridge members and the respective adjacent side edges of said panel.

8. The combination of claim 7 further characterized in that said heat bridge members are spaced approximately six inches from each other and approximately three inches inwardly from the respective adjacent side edges of said panel.

9. The combination of claim 6 further characterized in that said U-shaped portions are dimensioned so as to engage at least half of the peripheries of the respective pipes.

10. The combination of claim 6 further characterized in that said panel comprises an elongated central panel section and a pair of elongated outer panel sections arranged in side-by-side relation, each of said panel sections including a thermally conductive metal panel member having parallel flange portions projecting transversely from the plane of the panel member and extending along its oppositely disposed side edges with the innermost flange portions of said outer panel sections being rigidly connected to the adjacent flange portions of said central panel section to provide said heat bridge members, the outer ends of said rigidly connected flange portions having oppositely curved configurations whereby to provide a pair of elongated heat conducting saddles comprising said U-shaped portions, and the outermost flange portions of said outer panel sections comprising said flanges engaged by the panel supports for supporting the panel unit on the building structure.

References Cited in the file of this patent

UNITED STATES PATENTS

| | | |
|---|---|---|
| 2,712,771 | Norris | Sept. 12, 1939 |
| 2,357,560 | Taforo | Sept. 5, 1944 |
| 2,469,963 | Grosjean et al. | May 10, 1949 |
| 2,660,409 | Pittenger et al. | Nov. 24, 1953 |
| 2,718,383 | Frenger | Sept. 20, 1955 |
| 2,721,731 | Rapp | Oct. 25, 1955 |
| 2,751,198 | Rapp | June 19, 1956 |
| 2,800,308 | Parkinson et al. | July 23, 1957 |
| 2,805,842 | Andorfer | Sept. 10, 1957 |
| 2,818,235 | Baron | Dec. 31, 1957 |